May 30, 1933.  F. J. GIBBONS  1,912,074

THREADLESS PIPE CONNECTION

Filed June 5, 1931

Inventor
Frank J. Gibbons.

Patented May 30, 1933

1,912,074

UNITED STATES PATENT OFFICE

FRANK J. GIBBONS, OF WORCESTER, MASSACHUSETTS

THREADLESS PIPE CONNECTION

Application filed June 5, 1931. Serial No. 542,372.

The principal object of this invention is to provide a pipe connection which will grip the pipe without the threading of the pipe and hold it so that it will be water-proof, thus avoiding the necessity of threading the pipes and the inside of the binding element of the connection.

The invention also involves means whereby the connection can be used either for high or for low pressure.

Other objects and advantages of the invention will appear hereinafter.

Reference is to be had to the accompanying drawing, in which

This invention can be used for couplings, pipe-units, and fittings for pipes conducting liquid or gas or holding electric conduits. The coupling 10 shown is formed with pipe threads at both ends extending nearly to the center. It has hex ends for the reception of a wrench.

At each end is shown a longitudinally split binding sleeve 13 having pipe threads to screw into the pipe threads in the coupling and these binding sleeves constitute the principal feature of this invention.

Figure 1:
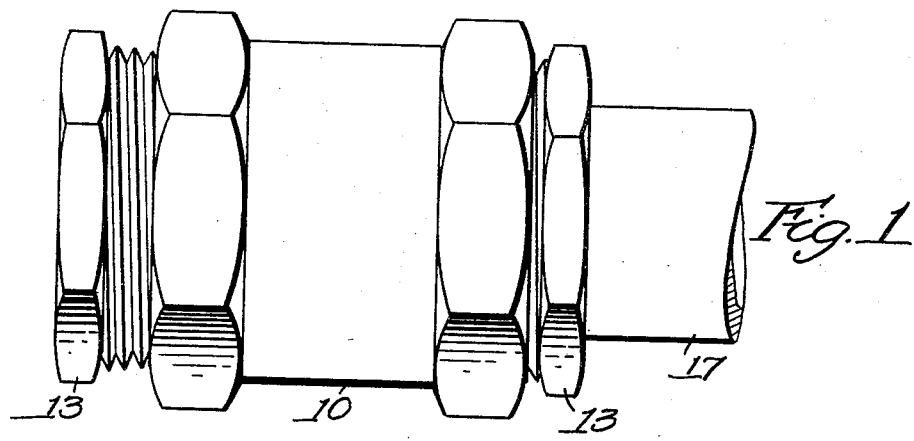
Fig. 1 is an outside view of a coupling constructed in accordance with this invention.
Figure 2:
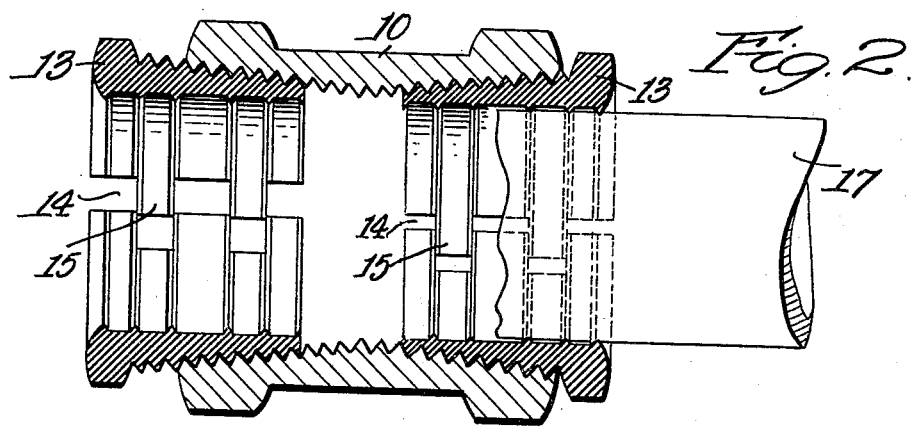
Fig. 2 is a diametrical sectional view of the same showing one pipe held in position and the other side showing the binding means open.
Figure 3:
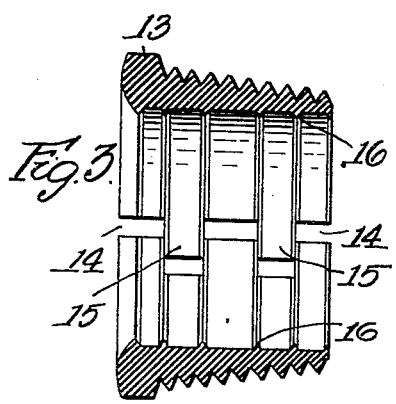
Fig. 3 is a diametrical sectional view of the pipe binding sleeve shown in closed position.

These sleeves are shown as having alternate slots 14 and tongues 15. This slot-and-tongue construction is made so that the tongues fit accurately in the slots and enter them when the sleeve is in closed or binding position, as shown in Fig. 3. This provides a connection at this point which is sufficient to prevent the passage of liquid under low pressure. The inside of the binding sleeve is of a general cylindrical form, but is provided with a series of parallel sharp ribs 16 each circumferential. It will be noticed that each rib where it comes to the end of a slot is in exact alignment with the other end of the rib which comes to the end of the tongue which enters that slot. They are so arranged that all these ribs come partly on a tongue on one side of the split and partly on the adjacent tongue on the other side of the split. The ribs are themselves slit circumferentially of the bushing and longitudinally of the ribs and if they are V-shaped in cross section, as shown, they are split in the center of the rib.

The pipe 17, without any screw thread on it, is introduced into the binding sleeve 13 while the latter is unscrewed. Now this sleeve, having a polygonal flange to receive a wrench, is screwed in. It is to be observed that, as the binding sleeve or nut takes hold of the pipe, it draws it closer and compresses it against a washer packing if that is used, and at any rate the circumferential ribs have sharp inner edges which dig into the pipe and hold it and also prevent leakage under low pressure. This construction effectively holds the pipe. It may be remarked that after the pipe is gripped the nut or binding sleeve can be turned up further, rotating the pipe with it. The other end, of course, is connected in the same way and when used for units, elbows, tees, and other fittings the member 10 will be replaced in accordance with constructions well known in this art.

This constitutes an extremely simple connection for pipes of various kinds and eliminates the threading of these pipes. Although the pipe is turned when the nut or sleeve is screwed down, on account of the digging of the ribs into the pipe, it does not have to be turned to any particular point and no attention has to be paid to it. As stated it can be used for various kinds of fittings.

Although I have illustrated and described only one form of the invention I am aware of the fact that modifications can be made therein by any person skilled in the art without departing from the scope of the invention as expressed in the claims. Therefore, I do not wish to be limited to the exact forms shown, but what I do claim is:—

1. As an article of manufacture, a split binding sleeve for a pipe fitting provided with a series of alternating parallel sided tongues and slots along both sides of the split alternating with each other so that the tongues on one side fit accurately the edges of the slots on the other side to prevent the passage of liquid under low pressure and a plurality of ribs extending around the sleeve on the inside, each rib so located as to have its end located partly on the edge of a tongue and partly cut off by the slot adjacent thereto, whereby the part rib on the alternating tongue on the other side will complete the rib on the first-named tongue and prevent leakage under high pressure.

2. As an article of manufacture, a split binding sleeve for a pipe fitting provided with a series of alternating tongues and slots along the split on both sides fitting each other and a series of ribs arranged circumferentially inside the sleeve and located at the edges of said tongues, said edges of the tongues being in such position that they bisect two ribs and a portion of each rib is located along the edge of the tongue and each rib is completed at that point by a portion of the other end of the same rib on the adjacent edge of the alternate tongue on the opposite side of the split.

In testimony whereof I have hereunto affixed my signature.

FRANK J. GIBBONS.